(12) United States Patent
McNutt et al.

(10) Patent No.: US 10,388,429 B1
(45) Date of Patent: Aug. 20, 2019

(54) HYBRID CABLE WITH LOW DENSITY FILLING COMPOUND

(71) Applicant: Superior Essex International LP, Atlanta, GA (US)

(72) Inventors: Christopher W. McNutt, Woodstock, GA (US); Robin D. Gainsford, Marietta, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 16/034,805

(22) Filed: Jul. 13, 2018

(51) Int. Cl.
| | |
|---|---|
| *H01B 7/285* | (2006.01) |
| *H01B 7/02* | (2006.01) |
| *H01B 11/02* | (2006.01) |
| *H01B 11/22* | (2006.01) |
| *G02B 6/44* | (2006.01) |

(52) U.S. Cl.
CPC .......... *H01B 7/285* (2013.01); *G02B 6/4413* (2013.01); *H01B 7/02* (2013.01); *H01B 11/02* (2013.01); *H01B 11/22* (2013.01)

(58) Field of Classification Search
CPC .......... H01B 7/285; H01B 7/02; H01B 11/02; H01B 11/22; G02B 6/4413
USPC ....................................................... 174/113 R
See application file for complete search history.

(56) References Cited

U.S. PATENT DOCUMENTS

| | | | | | |
|---|---|---|---|---|---|
| 4,324,453 | A | * | 4/1982 | Patel .................... | G02B 6/4401 174/23 C |
| 4,701,016 | A | * | 10/1987 | Gartside, III ........ | G02B 6/4401 174/110 SR |
| 5,461,195 | A | * | 10/1995 | Freeman .................. | H01B 3/22 156/48 |
| 5,502,288 | A | * | 3/1996 | Cogen .................... | H01B 3/441 174/113 R |
| 6,055,351 | A | * | 4/2000 | Yang .................... | G02B 6/4432 385/100 |
| 6,160,939 | A | * | 12/2000 | Sheu .................... | G02B 6/4433 385/100 |
| 6,228,495 | B1 | * | 5/2001 | Lupia .................... | H01B 3/441 428/379 |
| 6,236,789 | B1 | * | 5/2001 | Fitz .................... | G02B 6/4416 385/100 |
| 6,577,796 | B2 | * | 6/2003 | Anelli .................. | G02B 6/4433 385/103 |
| 8,452,142 | B1 | * | 5/2013 | Laws .................... | G02B 6/4401 385/101 |
| 9,116,320 | B1 | * | 8/2015 | Laws .................... | G02B 6/4401 |
| 10,137,601 | B2 | * | 11/2018 | Huang .................... | B29B 9/065 |
| 2003/0142932 | A1 | * | 7/2003 | Reyes-Gavilan ........ | C08K 5/13 385/100 |

(Continued)

*Primary Examiner* — Andargie M Aychillhum
*Assistant Examiner* — Michael F McAllister

(57) ABSTRACT

A hybrid or composite cable may include a core component and a plurality of buffer tubes positioned around the core component. The core component may include a plurality of twisted pairs of individually insulated conductors and a filling compound positioned between and around the plurality of twisted pairs. The filling compound may have a density of less than approximately 0.70 g/cm³ and may further include a plurality of microspheres. Each of the plurality of buffer tubes may be configured to house at least one optical fiber. Additionally, a jacket may be formed around the core component and the plurality of buffer tubes.

20 Claims, 2 Drawing Sheets

(56) References Cited

U.S. PATENT DOCUMENTS

| | | | |
|---|---|---|---|
| 2006/0235095 A1* | 10/2006 | Leberfinger | C08J 9/32 521/56 |
| 2006/0264559 A1* | 11/2006 | Lawate | C08K 5/01 524/492 |
| 2015/0205065 A1* | 7/2015 | Levy | G02B 6/4494 385/100 |
| 2016/0358691 A1* | 12/2016 | Patterson | H01B 7/285 |

* cited by examiner

HYBRID CABLE WITH LOW DENSITY FILLING COMPOUND

TECHNICAL FIELD

Embodiments of the disclosure relate generally to hybrid cables that include both optical fiber and twisted pair transmission media and, more particularly, to hybrid cables that include a low density filling compound.

BACKGROUND

Hybrid cables are utilized in a wide variety of applications that require the transmission of both power and communication signals. Various applications require hybrid cables to be installed in premises, indoor/indoor environments, outdoor or outside plant ("OSP") locations, buried locations, aerial locations, and/or vertical rise locations. Each of these locations expose cables to different environmental conditions and are subject to different standards and/or requirements. For example, outdoor applications (including OSP, buried, aerial, vertical rise, etc.) subject a cable to a wide range of temperature requirements, wet conditions, high wind shear conditions, and/or other conditions. Many cable standards include requirements associated with environmental conditions that a cable may be subjected to, such as sunlight resistance requirements, temperature requirements, and/or water penetration or water blocking requirements. There is an opportunity for improved hybrid cables that are suitable for use in a wide variety of applications.

In order to satisfy water blocking standards, cables typically must include means to mitigate the transmission of moisture through the cables to avoid decay in communication performance and possible power loss. Traditional techniques for satisfying water penetration requirements include the use of gel-filled cables that incorporate oil-based filling compounds in the core of a cable and, more recently, the use of dry cables that incorporate moisture absorbing materials, such as aramid yarns. Although dry cables are typically easier to handle during installation, these cables are more susceptible to mechanical stresses (e.g., wind shear, etc.) as they lack the cushioning effect realized by gel-filled cables. Additionally, it is often difficult to produce dry fiber optic or composite cables with an appropriate excess fiber length, especially for vertical applications in which seasonal temperature fluctuations could affect fiber performance.

Although conventional gel-filled cables provide improved mechanical support over dry cables, conventional gels or filling materials are often adversely affected by environmental conditions in certain applications, such as vertical rise applications. Vertical towers, such as cell towers, often utilize vertical rise cables to deliver power and/or communications signals to equipment, and the design of a vertical rise cable typically takes a number of factors into consideration, including ease of deployment, the length of the vertical rise, and environmental conditions. In vertical rise applications, elevation, wind, and temperature extremes challenge the theological properties of conventional oil-based gels. These conditions may translate into stresses that are above the yield of traditional gels, causing the gels to flow towards the bottom of an installed cable (e.g., into a termination cabinet). Accordingly, there is an opportunity for improved hybrid cables suitable for use in multiple applications including vertical rise applications. There is also an opportunity for improved hybrid cables that incorporate a low density filling compound.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
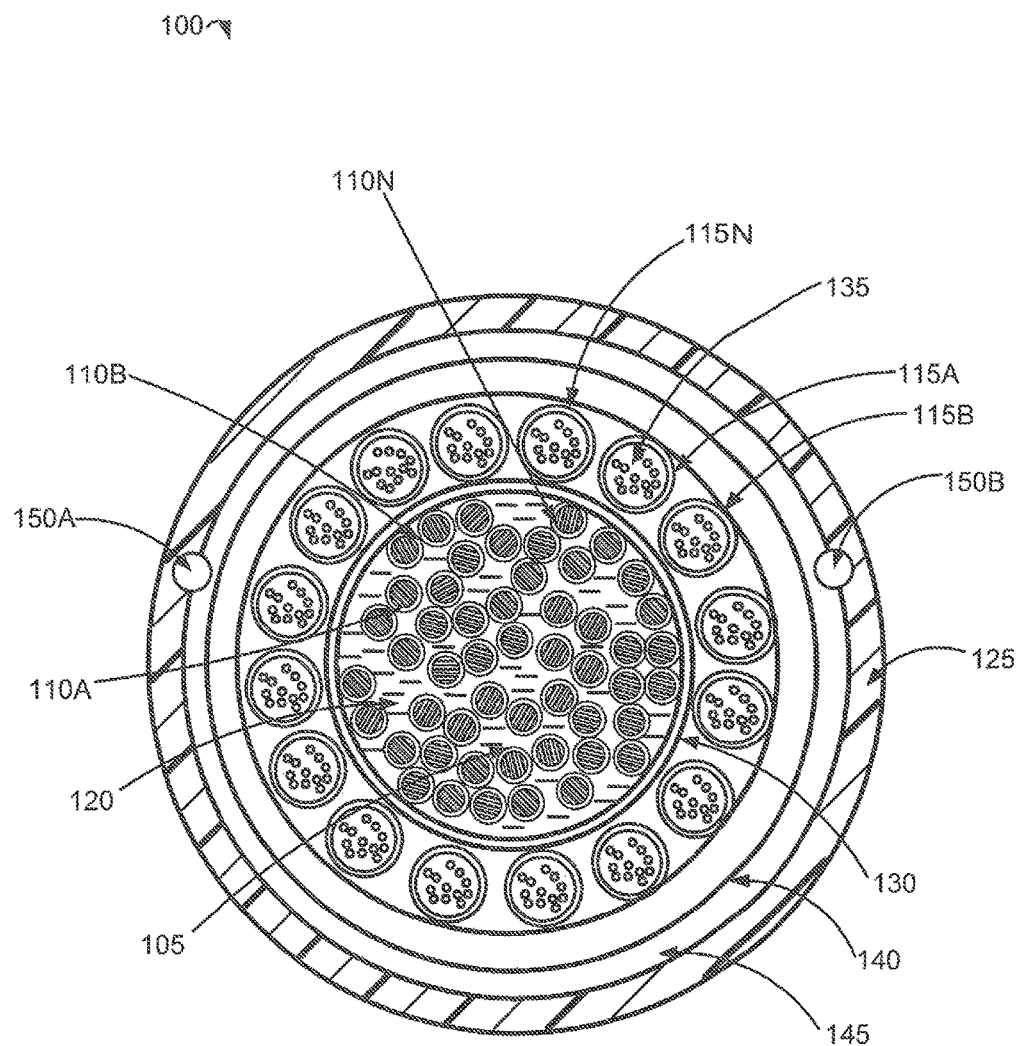
FIG. 1 depicts a cross-section view of an example hybrid cable incorporating a low density filling compound, according to an illustrative embodiment of the disclosure.

Various embodiments of the present disclosure are directed to hybrid cables that include a relatively low density filling compound. A hybrid cable may include a core component having a plurality of twisted pairs of individually insulated conductors, and a low density filling compound may be positioned between and around the plurality of twisted pairs. For example, the twisted pairs may be immersed within the low density filling compound, and the filling compound may be positioned in the interstices between the twisted pairs. In certain embodiments, the core component may additionally include an outer wrap formed around the twisted pairs and the filling compound. Additionally, a plurality of optical fiber buffer tubes may be positioned around the core component, for example, in one or more rings formed around the core component. Each buffer tube may be configured to house one or more optical fibers. As desired, the low density filling compound may also be positioned or utilized to fill one or more of the buffer tubes. A jacket may then be formed around the core component and the plurality of buffer tubes.

According to an aspect of the disclosure, the filling compound may have a relatively low density. For example, the filling compound may have a density that is less than approximately 0.70 g/cm. Additionally, the filling compound may have a relatively high critical yield stress. For example, the filling compound may have a critical yield stress of at least approximately 30 Pa or approximately 45 Pa. The filling compound may provide mechanical protection (e.g., cushioning, etc.) and water penetration protection or water blocking to internal cable components (e.g., the twisted pairs, etc.). The low density filling compound may have a lower density and higher critical yield stress than conventional filling compounds, such as elastomeric or extended thermoplastic rubber ("ETPR"), petrolatum-based filling compounds ("PE/PJ"), thixotropic gels, and/or other conventional gels or greases. The low density filling compound may also be easier to clean or remove relative to conventional filling compounds during cable installation and termination. Additionally, the low density filling compound may exhibit improved flow resistance relative to conventional filling compounds, thereby allowing the cable to be installed in and/or having improved performance in vertical rise and/or aerial applications. Thus, the low density filling compound may be more desirable for use in vertical rise cables relative to conventional gels. Indeed, a cable including the low density filling compound may be suitable for a wide variety of applications including, but not limited to, premises, indoor/outdoor, OSP, buried, aerial, and/or vertical rise applications.

In certain embodiments, the low density filling compound may incorporate microspheres, such as microspheres dispersed throughout the low density filling compound. For example, microspheres may be suspended within or dispersed throughout an oily base or oil-based substance (e.g., a hydrocarbon oil, a silicon oil, etc.). As desired, one or more antioxidants may also be incorporated into the filling compound. Additionally, in certain embodiments, the low density filling compound may be substantially free of thixotropic agents. In certain embodiments, use of a low density filling compound may provide a cable that is lighter than conventional gel-filled cables. As a result, a cable may be easier to handle, ship, and install. Further, at higher temperatures, microspheres in the low density filling compound will expand, thereby providing a higher effective critical yield stress. As a result, the low density filling compound will cling to other components of a cable, such as a conductors, one or more buffer tubes, a jacket, etc., and the filling compound will be less likely than conventional filling compounds to fall or drip at higher temperatures. The low density filling compound will also be less likely than conventional filling compounds to fall or drip as a result of wind shear and/or other environmental conditions that impart mechanical stresses on the cable.

Additionally, the low density filling compound may be incorporated into any number of spaces or areas within a cable. For example, the low density filling compound may be incorporated into a core component such that it is positioned between and/or around a plurality of twisted pairs or other conductors. As another example, the low density filling compound may be incorporated into one or more buffer tubes. In other words, the low density filling compound may be incorporated into the interstitial spaces between optical fibers and/or optical fibers and a buffer tube. As another example, the low density filling compound may be positioned inside an outer jacket. In this regard, the low density filling compound may be present in the interstitial spaces between internal components of the cable. Use of a low density filling compound may also facilitate the formation of a cable with a relatively small form factor. In certain embodiments, a hybrid cable including both optical fibers and/or conductors suitable for power transmission may be formed with a relatively small outer diameter, such as a diameter that is less than or equal to approximately 0.80 inches.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a cross-section view of an example hybrid cable 100 incorporating a low density filling compound, according to an illustrative embodiment of the disclosure. The cable 100 is illustrated as a hybrid or composite cable that includes a combination of metallic conductors and optical fibers; however, cables that incorporate a suitable low density filling compound may include a wide variety of different transmission media and/or combinations of transmission media, including but not limited to, power conductors, twisted pair conductors, optical fibers, coaxial cables, etc. As illustrated in FIG. 1, the cable 100 may be a hybrid cable including a core component 105 containing a plurality of twisted pairs 110A-N of individually insulated conductors and a plurality of optical fiber components, such as a plurality of buffer tubes 115A-N formed or positioned around the core component 105. According to an aspect of the disclosure, the core component 105 may be filled with a low density filling compound 120. An outer jacket 125 may then enclose the core component 105, the buffer tubes 115A-N, and other internal components of the cable 100. Each of these components, as well as additional components that may optionally be incorporated into the cable 100, is described in greater detail below.

The cable 100 may be suitable for use in a wide variety of suitable applications. For example, the cable 100 may be suitable for use in premises, indoor/outdoor, OSP, buried, aerial, vertical rise applications, and/or other applications. The low density filling compound 120 may provide water blocking that permits the cable 100 to be utilized in outdoor environments. Additionally, the low density filling compound 120 may exhibit improved flow resistance and/or a higher critical yield stress than conventional filling compounds, thereby facilitating use of the cable 100 in vertical rise, aerial, and/or applications subject to relatively high wind shear. In an example vertical rise application, the cable 100 may be installed at a cellular tower or other telecommunications site calling for a vertical cable to connect equipment at or near the top of the site to equipment or a network at or near the bottom (or any other lower location) of the site. In an example cell tower application, one or more conductors, such as the twisted pairs 110A-N incorporated into the core component 105, may provide power to one or more transceivers situated at or near the top of a cell tower. Additionally, one or more other transmission media, such as optical fibers positioned within the buffer tubes 115A-N, may facilitate communication between the one or more transceivers and other equipment. In certain embodiments, the cable 100 may be installed vertically or in an approximate vertical arrangement. Additionally, in certain embodiments, at least a portion of the cable 100 may be positioned in an outdoor environment or in an environment subject to outdoor whether conditions, such as temperature fluctuations, wind shear, and/or ice.

The core component 105 may be formed as a central component of the cable 100. The core component 105 may include a plurality of conductors that are configured or suitable for transmitting one or more desired power signals. In certain embodiments, the core component 105 may include a plurality of twisted pairs 110A-N of individually insulated conductors. Other types of conductors suitable for transmitting power may utilized in other embodiments. In certain embodiments, the use of twisted pairs 110A-N may provide the cable 100 with enhanced flexibility relative to cables that include larger power conductors. Any number of twisted pairs 110A-N may be incorporated into the cable 100 as desired in various embodiments. In certain embodiments, four (4), twenty-five (25), fifty (50), one hundred (100), or any other suitable number of twisted pairs may be incorporated into the core component 105. Each twisted pair (referred to generally as twisted pair 105) may include two electrical conductors, each covered with respective insulation. The electrical conductors of a twisted pair 105 may be formed from any suitable electrically conductive material, such as copper, aluminum, silver, annealed copper, gold, a conductive alloy, etc. Additionally, the electrical conductors may have any suitable diameter, gauge, and/or other dimensions. Further, each of the electrical conductors may be formed as either a solid conductor or as a conductor that includes a plurality of conductive strands that are twisted together.

In certain embodiments, the electrical conductors of one or more twisted pairs may be sized in order to transmit a desired power signal. For example, the electrical conductors may be formed with a suitable diameter or cross-sectional area that facilitates transmission of a 300 V root mean square ("RMS") power signal. Each of the conductors of a twisted pair 105 may be formed with any suitable diameter. In certain embodiments, the electrical conductors of certain twisted pairs (e.g., illustrated twisted pairs 105A-N, etc.) may be 22 AWG or larger conductors. In other words, electrical conductors may have a diameter and/or cross-sectional area that is greater than or equal to required minimum dimensions for 22 AWG conductors. For example, electrical conductors may have a diameter that is greater than or equal to approximately 0.0240 inches (0.6096 mm).

The twisted pair insulation may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. Additionally, in certain embodiments, the insulation of each of the electrical conductors utilized in the twisted pairs 105A-N may be formed from similar materials. In other embodiments, at least two of the twisted pairs may utilize different insulation materials. In yet other embodiments, the two conductors that make up a twisted pair 105 may utilize different insulation materials. As desired in certain embodiments, insulation may additionally include a wide variety of other materials (e.g., filler materials, materials compounded or mixed with a base insulation material, etc.), such as smoke suppressant materials, flame retardant materials, etc.

In various embodiments, twisted pair insulation may be formed from one or multiple layers of insulation material. A layer of insulation may be formed as solid insulation, unfoamed insulation, foamed insulation, or other suitable insulation. As desired, a combination of different types of insulation may be utilized. For example, a foamed insulation layer may be covered with a solid foam skin layer. Additionally, the insulation may be formed with any suitable thickness, inner diameter, outer diameter, and/or other dimensions. Each of the twisted pairs 105A-N may also be formed with any suitable twist lay. In certain embodiments, the twisted pairs 105A-N may be formed with similar or approximately equal twist lays. In other embodiments, various twisted pairs may be formed with different twist lays. For example, each twisted pair may be formed with a different twist lay or each twisted pair within a given subgroup may be formed with a different twist lay. Indeed, a wide variety of suitable combinations of twist lays may be utilized as desired in various embodiments. Additionally, in certain embodiments, the plurality of twisted pairs 105A-N may be twisted together with any suitable overall or bunch lay. In other embodiments, the plurality of twisted pairs 105A-N may be loosely positioned within the core component 105 without being twisted together.

As desired, a twisted pair 105 or a given number of twisted pairs may additionally or alternatively be utilized to carry data or some other form of information, for example in a range of about one to ten Giga bits per second ("Gbps") or other suitable data rates, whether higher or lower. In certain embodiments, each twisted pair 105 may support data transmission of about two and one-half Gbps (e.g. nominally two and one-half Gbps). In the event that one or more twisted pairs 105A-N are utilized to transmit communications signals, varying or different twist lays may reduce cross-talk between the twisted pairs.

In certain embodiments, the core component 105 may additionally include a wrap 130 that is formed around the plurality of twisted pairs 105A-N. In other embodiments, one or more binder threads may be helically wrapped around the plurality of twisted pairs 105A-N. In yet other embodiments, an inner jacket, such as an extruded inner jacket, may be formed around the plurality of twisted pairs 105A-N. The wrap 130 may assist in maintaining the positions of the twisted pairs 105A-N and/or holding or bundling the twisted pairs 105A-N together. In certain embodiments, the wrap 130 may also assist in limiting migration of the filling compound 120 out of the core component 105. The wrap 130 may be a single or multi-layer wrap formed from any suitable material and/or combinations of materials. In certain embodiments, the wrap 130 may be longitudinally curled around the twisted pairs 105A-N. For example, the wrap 130 may be positioned such that it has two longitudinally extending widthwise edges, and one or both of the edges may be curled around the twisted pairs 105A-N in order to enclose the twisted pairs 105A-N. As desired, the wrap 130 may be bonded, adhered, ultrasonic welded, or otherwise affixed to itself (e.g., affixed with mechanical fasteners, etc.) after it is wrapped or curled around the twisted pairs 105A-N. In other embodiments, the wrap 130 may be helically twisted around the twisted pairs 105A-N. As desired, adjacent helical wrappings may overlap one another along a longitudinal length such that the twisted pairs 105A-N are enclosed.

The wrap 130 may be formed with a wide variety of suitable dimensions as desired in various embodiments. For example, the wrap 130 may be formed with any suitable thickness and/or width. In certain embodiments, a width may be selected such that the wrap 130 may be longitudinally curled around the twisted pairs 105A-N in order to enclose or surround the twisted pairs 105A-N. As desired, the width may be selected to facilitate any desired overlap to be formed when a widthwise edge of the wrap 130 is curled around the twisted pairs 105A-N and the opposite widthwise edge. The wrap 130 may also be formed from a wide variety of suitable materials. For example, the wrap 130 may be formed from one or more polymeric materials, one or more polyolefins (e.g., polyethylene, polypropylene, etc.), one or more fluoropolymers (e.g., fluorinated ethylene propylene ("FEP"), one or more polyesters, or a combination of any of the above materials. In certain embodiments, the wrap 130 may be formed from a biaxially-oriented polyethylene terephthalate or mylar material.

In certain embodiments, the wrap 130 may be formed from all dielectric materials. In other embodiments, the wrap 130 may incorporate shielding material, such as electrically conductive shielding material. For example, the wrap 130 may include a layer of electrically conductive material formed on a dielectric layer or between two dielectric layers. Indeed, the wrap 130 may include any suitable number of layers, and each layer may be formed from a wide variety of suitable materials.

According to an aspect of the disclosure, a low density filling compound 120 may also be incorporated into the cable 100. The low density filling compound may be incorporated into any number of spaces or areas within the cable 100. For example, the low density filling compound 120 may be incorporated into the core component 105. The filling compound 120 may be positioned between and/or around the twisted pairs 105A-N. For example, the filling compound 120 may fill the interstitial spaces between the twisted pairs 105A-N and/or between the twisted pairs 105A-N and the wrap 130. As desired in various embodiments, the low density filling compound 120 may additionally be incorporated into other components of the cable 100. For example, the filling compound 120 may be incorporated into one or more of the buffer tubes 115A-N. As another example, the filling compound 120 may be positioned between the core component 105 and the buffer tubes 115A-N, in the interstitial spaces between the buffer tubes 115A-N, and/or in the interstitial spaces between the buffer tubes 115A-N and the outer jacket 125 or other layer (e.g., a strength layer, a water blocking layer, an armor layer, etc.) formed around the buffer tubes 115A-N.

The low density filling compound 120 may provide mechanical protection (e.g., cushioning, etc.) and water penetration protection or water blocking to cable components surrounded by the filling compound 120, such as the twisted pairs 105A-N incorporated into the core component 105. Additionally, the low density filling compound may exhibit improved flow resistance relative to conventional gels or conventional filling compounds, such as ETPR or PE/PJ. As a result, the low density filling compound 120 may exhibit less dripping or falling due to environmental conditions, such as high wind shear conditions and/or high temperature conditions when the cable 100 is installed in a vertical, aerial, or outdoor location. The low density filling compound 120 may also be compatible with other materials utilized to form other components of the cable 100, such as the buffer tubes 115A-N. Accordingly, the low density filling compound 120 may be utilized within one or more of the buffer tubes 115A-N. Additionally, in the event that the low density filling compound 120 escapes or leaks out of the core component 105, the low density filling compound 120 may not damage or harm the buffer tubes 115A-N. Alternatively, the core component 105 may be formed without a wrap 130, and the low density filling compound 120 may be positioned between the twisted pairs 110A-N and the buffer tubes 115A-N. By contrast, conventional filling compounds may be less compatible with certain types of buffer tubes, leading to potential damage or degradation of the buffer tubes.

In certain embodiments, the low density filling compound 120 may incorporate or include microspheres. For example, microspheres may be dispersed throughout the low density filling compound 120. In certain embodiments, the microspheres may be formed as polymeric microspheres utilizing any number of polymers and/or copolymers. For example, each microsphere may have a shell formed of a copolymer of acrylonitrile and methacrylonitrile. In certain embodiments, microspheres may be suspended within or dispersed throughout an oily base or oil-based substance (e.g., a hydrocarbon oil, a silicon oil, etc.). As desired, a thermoplastic elastomer may be incorporated into the low density filling compound as an organic polymeric gelling agent. In certain embodiments, the low density filling compound 120 may be substantially free of thixotropic agents. In certain embodiments, the low density filling compound 120 may incorporate one or more antioxidants, such as fumed silica. In other embodiments, the low density filling compound 120 may be free of silica.

The low density filling compound 120 may have a wide variety of suitable densities as desired in various embodiments. According to an aspect of the disclosure, the filling compound 120 may have a density that is less than approximately 0.70 g/cm$^3$. For example, the filling compound may have a density between approximately 0.25 and approximately 0.70 grams per cubic centimeter. In certain embodiments, the filling compound 120 may have a density that is less than approximately 0.45 g/cm$^3$. For example, the filling compound 120 may have a density in the range of approximately 0.35 to approximately 0.45 grams per cubic centimeter. In various embodiments, the filling compound 120 may have a density of approximately 0.25, 0.30, 0.35, 0.40, 0.45, 0.50, 0.55, 0.60, 0.65, 0.70, 0.75, 0.78, or 0.80 grams per cubic centimeter, a density included in a range between any two of the above values, or a density included in a range bounded on a maximum end by one of the above values. Additionally, in certain embodiments, the density of the filling compound may be inversely proportional to the number of microspheres incorporated into the filling compound. In other words, as more microspheres are incorporated into the filling compound, the density may be reduced.

The low density filling compound 120 may also have a relatively high critical yield stress. According to an aspect of the disclosure, the filling compound 120 may have a critical yield stress of at least approximately 30 Pa. For example, the filling compound 120 may have a critical yield stress of at least approximately 45 Pa. In various embodiments, the filling compound 120 may have a critical yield stress of approximately 30, 40, 45, 50, 60, 70, 75, 80, 90, or 100 Pa, a critical yield stress included in a range between any two of the above values, or a critical yield stress included in a range bounded on a minimum end by one of the above values.

Use of a low density filling compound 120 may provide a cable 100 that is lighter than conventional gel-filled cables, such as cables that incorporate thixotropic gels. As a result, the cable 100 cable may be easier to handle, ship, and install. Further, at higher temperatures, the microspheres in the low density filling compound 120 will expand, thereby providing a higher effective critical yield stress. In certain embodiments, the yield stress may rise between approximately 0.15 to approximately 0.50 Pascals (Pa) for every 10 degrees Celsius rise in temperature. These yield stress rises may be applicable to any desired operating range, such as an operating range between approximately 20 degrees Celsius and approximately 80 degrees Celsius. As a result, the low density filling compound 120 will cling to other components of the cable 100. The filling compound 120 will, therefore, be less likely than conventional filling compounds to fall or drip at higher temperatures, such as temperatures greater than or equal to approximately 35 degrees Celsius. The low density filling compound 120 will also be less likely to fall or drip as a result of wind shear and/or other environmental conditions that impart mechanical stresses on the cable 100. The low density filling compound 120 may also be easier to wipe clean from internal cable components (e.g., fiber, conductors, etc.) relative to conventional filling compounds. Thus, it may be relatively easier to install and connect the cable 100. Additionally, due to the cushioning provided to internal cable components by the low density filling compound 120, the cable 100 may exhibit improved mechanical protection relative to conventional dry cables.

With continued reference to FIG. 1, the cable 100 may include a plurality of optical fiber components positioned around the core component 105. For example, in certain embodiments, a plurality of buffer tubes 115A-N may be positioned around the core component 105. Each buffer tube (generally referred to as buffer tube 115) may be a suitable sheath configured to house one or more optical fibers 135. In certain embodiments, each buffer tube 115 may be formed as a loose tube. In other words, the optical fibers 135 may be loosely positioned within the buffer tube 115. As desired, a plurality of optical fibers 135 may be arranged into one or more suitable bundles or groupings. In other embodiments, a plurality of optical fibers may be incorporated into one or more ribbons and/or a ribbon stack.

The buffer tube 115 may be formed from any suitable materials or combinations of materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, polyvinylidene fluoride ("PVDF"), polybutylene terephthalate ("PBT"), ethylene, plastic, or other appropriate materials or combinations of suitable materials. Additionally, the buffer tube 115 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. As another example, a flame retarding or other suitable additive may be incorporated into a first layer but not into a second layer. Further, the buffer tube 115 may have any suitable inner and/or outer diameters as desired in various applications. For example, the buffer tube 115 may be appropriately sized to house a desired number of optical fibers 135 and/or any other components incorporated into the buffer tube 115.

Any suitable number of buffer tubes 115A-N may be incorporated into the cable 100 as desired in various embodiments. For example, in certain embodiments, sixteen (16) buffer tubes 115A-N may be positioned around the core component 105. In certain embodiments, the buffer tubes 115A-N may be helically wrapped around the core component 105 with any suitable twist lay. In other embodiments, the buffer tubes 115A-N may be S-Z stranded around the core component 105. In yet other embodiments, the buffer tubes 115A-N may longitudinally extend parallel to the core component 105.

Figure 2:
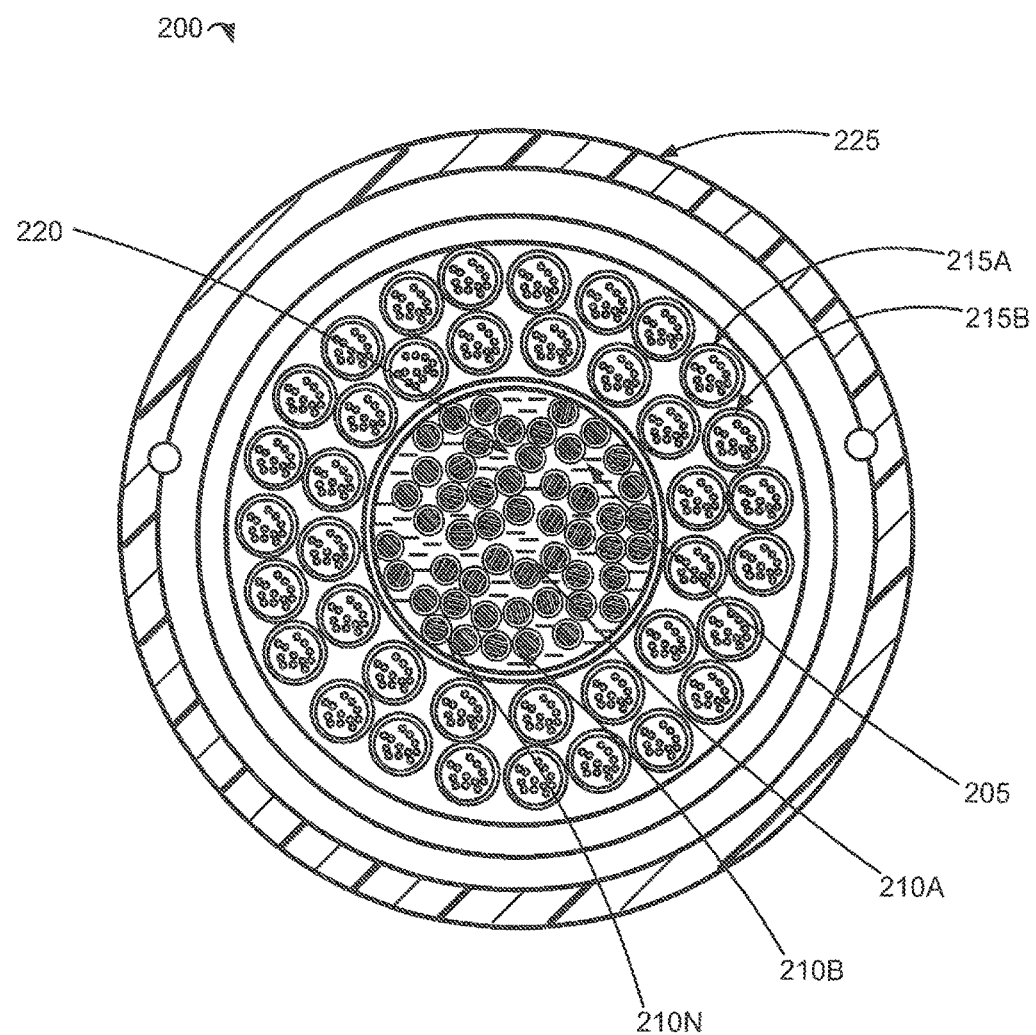
FIG. 2 depicts a cross-sectional view of another example hybrid cable incorporating a low density filling compound, according to an illustrative embodiment of the disclosure.

Additionally, in certain embodiments, the plurality of buffer tubes 115A-N may be positioned in one or more rings around the core component 105. FIG. 1 illustrates an example cable 100 in which the plurality of buffer tubes 115A-N are positioned in a single ring around the core component 105. FIG. 2, which is described in greater detail below, illustrates an example cable 200 in which a plurality of buffer tubes are positioned in a plurality of rings around a core component. The plurality of buffer tubes 115A-N may be positioned in any number of suitable rings as desired in various embodiments. Further, even if the plurality of buffer tubes 115A-N are helically twisted or S-Z stranded, in certain embodiments, the core component 105 may be surrounded by one or more rings of buffer tubes 115A-N at any given cross-sectional location along a longitudinal length of the cable 100. In other words, the one or more rings of buffer tubes 115A-N may surround the core component 105 at any given cross-sectional locations along the longitudinal length.

As desired in various embodiments, one or more spacers, fillers, or other components may be utilized in place of one or more of the buffer tubes 115A-N. Alternatively, one or more empty buffer tubes may be utilized. Spacers, fillers, and/or empty buffer tubes may be utilized to provide the cable 100 with a desired overall cross-sectional shape. As one example, the cable 100 may be designed to house a number of optical fibers that may be placed into less than sixteen buffer tubes. A filler may be substituted for one or more buffer tubes in order to provide the cable 100 with a desired sixteen buffer tubes around one core component 105 design or geometry.

Any suitable number of optical fibers 135 may be housed within each buffer tube 115. In certain embodiments, each of the plurality of buffer tubes 115A-N may be configured to house twelve (12) optical fibers. Other numbers of optical fibers may be positioned within each buffer tube as desired in other embodiments. Further, in certain embodiments, each of the plurality of buffer tubes 115A-N may house the same number of optical fibers. In other embodiments, at least two of the plurality of buffer tubes may house a different number of optical fibers. Each optical fiber may be a single mode fiber, multi-mode fiber, pure-mode fiber, polarization-maintaining fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. In certain embodiments, an optical fiber may include a core that is surrounded by a cladding. Additionally, one or more suitable coatings may surround the cladding.

In certain embodiments, one or more of the plurality of buffer tubes 115A-N may be filled with the low density filling compound 120. In other words, the low density filling compound 120 may be positioned between and/or around the optical fibers 135. For example, the filling compound 120 may be positioned in the interstitial spaces between the optical fibers 135 and/or in the interstitial spaces between the optical fibers 135 and the inner wall of the buffer tube 115 (or any wrap formed around the optical fibers 135). The low density filling compound 120 may provide mechanical cushioning for the optical fibers 135 and/or limit or prevent water penetration into a buffer tube 115. As desired, a wide variety of other components may optionally be incorporated into a buffer tube 115 included, but not limited to, a water blocking tape, one or more strength yarns, a dry insert (e.g., for buffer tubes with no filling compound, etc.), etc.

Although the cable 100 is illustrated as including loose buffer tubes 115A-N as optical fiber components, in other embodiments, the cable 100 may additionally or alternatively include other types of optical fiber components. For example, in certain embodiments, the cable 100 may include a plurality of microtubes formed around the core component 105. A microtube may have an inner diameter that is sized to allow housed optical fibers to move relative to one another while preventing the optical fibers from crossing over or overlapping one another. In other words, the microtube may permit the optical fibers to flex or move as the cable is flexed or bent while simultaneously maintaining the position of each optical fiber relative to the other optical fibers. In certain embodiments, an inner diameter of the microtube may be determined based at least in part on the number of optical fibers to be positioned within the microtube, the outer diameters of the optical fibers, and/or the dimensions of any other internal components of the microtubes. As a result of using one or more microtubes, it may be possible to reduce or minimize the diameter of the cable 100 relative to cables that incorporate loose buffer tubes. In yet other embodiments, the cable 100 may include a plurality of tight buffered optical fibers positioned around the core component 105. A tight buffer may be formed from any suitable material and/or combinations of materials and/or with any suitable thickness. In yet other embodiments, the cable 100 may include a combination of different types of fiber components. As set forth above, fiber components may be incorporated into any number of rings and/or other groupings positioned around the core component 105.

With continued reference to FIG. 1, one or more water blocking components may optionally be incorporated into the cable 100. For example, a water blocking tape 140 may optionally be wrapped or positioned around the plurality of buffer tubes 115A-N. The water blocking tape 140 may be formed from a wide variety of suitable materials and/or combinations of materials. For example, the water blocking tape 140 may be formed as a polymer tape that includes superabsorbent powder ("SAP") or other suitable water absorbing and/or water blocking materials formed thereon or positioned between two polymeric layers. A water blocking tape 140 may also have a wide variety of suitable dimensions, such as any suitable thickness. In other embodiments, one or more water swellable yarns may be wrapped or partially wrapped around the plurality of buffer tubes 115A-N and/or otherwise incorporated into the cable. As desired, water swellable and/or water blocking components may be provided in a continuous or discontinuous manner along a longitudinal length of the cable 100. Additionally or alternatively, water blocking material (e.g., water blocking dams) may be intermittently incorporated into a cable core.

In certain embodiments, one or more strength members may also be incorporated into a cable core. For example, one or more strength yarns may be positioned within the cable core. In certain embodiments, one or more strength yarns may be wrapped around the plurality of buffer tubes 115A-N and any intervening layers (e.g., a water blocking tape, etc.). A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. As explained in greater detail below, in certain embodiments, one or more strength members (e.g., strength rods, etc.) may additionally or alternatively be incorporated into the cable jacket 125.

As desired in various embodiments, the cable 100 may also include a suitable armor layer 145 that provides mechanical protection for the cable 100. A wide variety of suitable types of armor layers may be utilized. In certain embodiments, the armor layer 145 may be formed as a metallic armor layer, such as a corrugated steel armor layer. For example, a metallic tape (e.g., a steel tape, etc.) may be formed so as to interlock with itself and/or may be corrugated. In other embodiments, the armor layer 145 may be formed as a dielectric armor layer from one or more dielectric or non-conductive materials, such as fiberglass, glass, epoxy, polymeric materials, etc. As desired, the armor layer 145 may be coated with a polymer to promote adhesion, bonding, or a selected level of friction with the interior surface of the cable jacket 125. The armor layer 145 may also be formed with a wide variety of suitable dimensions (e.g., any suitable thickness, etc.) and/or with any desired number and/or sizes of corrugations.

The outer jacket 125 may define an outer periphery of the cable 100. The jacket 125 may enclose the internal components of the cable 100, seal the cable 100 from the environment, and provide strength and structural support. The jacket 125 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 125 may also include flame retardant materials, smoke suppressant materials, carbon black or other suitable material for protection against exposure to ultraviolet ("UV") light, and/or other suitable additives. The jacket 125 may include a single layer or, alternatively, multiple layers of material (i.e., multiple layers of the same material, multiple layers of different materials, etc.). As desired, the jacket 125 may be characterized as an outer sheath, a casing, a circumferential cover, or a shell.

The jacket 125 may enclose one or more openings in which other components of the cable 100 are disposed. At least one opening enclosed by the jacket 125 may be referred to as a cable core, and any number of other cable components may be disposed in a cable core. In the cable 100 illustrated in FIG. 1, the core component 105, plurality of buffer tubes 115A-N and one or more optional components (e.g., a water blocking tape 140, an armor layer 145, etc.) may be situated within a cable core. A wide variety of other components may be situated within a cable core as desired, such as other transmission media, tight buffered optical fibers, various separators or dividers, spacers, inner jackets, etc. Indeed, a wide variety of different cable constructions may be utilized in accordance with various embodiments of the disclosure.

Additionally, the illustrated cable 100 has a circular or approximately circular cross-sectional profile. In other embodiments, other cross-sectional profiles (e.g., an elliptical or oval profile, etc.) and/or dimensions may be utilized as desired. In other words, the jacket 125 may be formed to result in any desired shape. The jacket 125 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable. For example, a cable profile may facilitate duct or conduit installation, clamping in aerial and/or other applications, etc., and the cable 100 may be designed to withstand a specified installation tensile loading and/or other suitable design parameters.

In certain embodiments, at least one "ripcord" may be incorporated into the cable 100, for example, within a cable core. The cable 100 of FIG. 1 is illustrated as having two ripcords 150A, 150B positioned between the jacket 125 and the armor layer 145. Any other suitable number of ripcords may be utilized as desired. A ripcord (generally referred to as ripcord 150) may facilitate separating the jacket 125 from other components of the cable 100. In other words, the ripcord 150 may help open the cable 100 for installation or field service. A technician may pull the ripcord 150 during installation in order to access internal components of the cable 100. A ripcord may be formed from a wide variety of suitable materials and/or with a wide variety of suitable dimensions.

In certain embodiments, one or more relatively rigid strength members (not shown) may be incorporated into the cable 100. For example, one or more strength rods may be embedded in the jacket 125. In certain embodiments, the jacket 125 may be formed or extruded around one or more strength members. Embedded strength members may be located at any desired points within the jacket 125. For example, strength members may be located on opposing lateral sides of a longitudinal axis of the cable 100. The strength members may enhance tensile strength of the cable 100. In other embodiments, one or more strength rods may be situated within a cable core. Indeed, a wide variety of strength member configurations may be utilized.

In certain embodiments, the cable 100 may include one or more electrical shield layers situated within the cable core. For example, a shield tape or other shield layer can be disposed between the jacket 115 and one or more transmission media, such as one or more twisted pairs. In certain embodiments, a shield layer may be disposed between the jacket 115 and one or more transmission media. In other embodiments, transmission media may be individually shielded or one or more desired groups of transmission media may be shielded. A shield may be formed from a wide variety of suitable materials. In certain embodiments, a metallic foil or braided metallic shield may be provided. In other embodiments, a discontinuous shield may be formed that includes discrete metallic components, such as metallic patches formed on one or more dielectric layers. As desired, a shield may be continuous or discontinuous along a longitudinal length of the cable. For example, a shield may be formed as a single component or a plurality of shield segments may be incorporated into a cable core.

As desired, the cable 100 may be formed with a relatively small form factor, diameter, and/or cross-sectional area. In certain embodiments, the arrangement of the cable components (e.g., the twisted pairs 110A-N, the buffer tubes 115A-N, etc.) may reduce the size of interstices within the cable core. Additionally, filling at least a portion of the interstices with a low density filling compound 120 may permit the cable 100 to be used in a wide variety of suitable application. In certain embodiments, the cable 100 may be formed with a diameter that is less than or equal to approximately 0.08 inches. In various embodiments, the cable 100 may be formed with a diameter of approximately 0.07, 0.072, 0.075, 0.077, 0.079, 0.0799, 0.08, 0.082, or 0.085 inches, a diameter included in a range between any two of the above values, or a diameter included in a range bounded on a maximum end by one of the above values.

FIG. 2 depicts a cross-sectional view of another example hybrid cable 200 incorporating a low density filling compound, according to an illustrative embodiment of the disclosure. The cable 200 of FIG. 2 may include components that are similar to those of the cable 100 discussed above with reference to FIG. 1. For example, the cable 200 may include a core component 205 that includes any suitable number of twisted pairs 210A-N. Additionally, a plurality of buffer tubes 215A-N or other suitable optical fiber components may be positioned around the core component 205. A low density filling compound 220 may be positioned within the core component 205 and optionally within one or more of the buffer tubes 215A-N and/or within the cable core. As desired, the cable 200 may additionally include one or more water blocking components (e.g., a water blocking tape, etc.), an armor layer, one or more strength layers and/or other strength members, and/or a wide variety of other components. A jacket 225 may then be formed around the internal components of the cable 200. Each of the components of the cable 200 may be similar to those described above with reference to the cable 100 of FIG. 1.

However, in contrast to the cable 100 of FIG. 1, the plurality of buffer tubes 215A-N incorporated into the cable 200 of FIG. 2 are positioned around the core component 205 in a plurality of rings or layers. As discussed above, any suitable number of rings of buffer tubes 215A-N or other optical fiber components (e.g., microtubes, tight buffered fibers, etc.) may be formed around the core component 205.

The cables 100, 200 illustrated in FIGS. 1 and 2 are provided by way of example only. Embodiments of the disclosure contemplate a wide variety of other cables and cable constructions. These other cables may include more or less components than the cables 100, 200 illustrated in FIGS. 1 and 2. Additionally, certain components may have different dimensions and/or materials than the components illustrated in FIGS. 1 and 2.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A cable, comprising:
    a core component comprising:
        a plurality of twisted pairs of individually insulated conductors; and
        a filling compound positioned between and around the plurality of twisted pairs, the filling compound having a density less than 0.70 g/cm$^3$ and a critical yield stress of at least 30 Pa, the filling compound comprising a plurality of microspheres;
    a plurality of buffer tubes positioned around the core component, each of the plurality of buffer tubes configured to house at least one optical fiber; and
    a jacket formed around the core component and the plurality of buffer tubes.

2. The cable of claim 1, wherein the critical yield stress of the filling compound rises between 0.15 and 0.50 Pa for every 10° C. rise in temperature between 20° C. and 80° C.

3. The cable of claim 1, wherein the filling compound is further positioned within at least one of the plurality of buffer tubes.

4. The cable of claim 1, wherein the core component further comprises a wrap formed around the plurality of twisted pairs.

5. The cable of claim 1, wherein the plurality of twisted pairs comprises twenty-five twisted pairs.

6. The cable of claim 1, wherein the plurality of buffer tubes comprises sixteen buffer tubes.

7. The cable of claim 1, wherein the plurality of buffer tubes are helically twisted around the core component.

8. The cable of claim 1, wherein the cable comprises an outer diameter that is less than or equal to 0.80 inches.

9. A cable, comprising:
 a core component comprising:
  at least twenty-five twisted pairs of individually insulated conductors; and
  a filling compound positioned between and around the twisted pairs, the filling compound having a density less than 0.70 g/cm$^3$ and a critical yield stress of at least 30 Pa, the filling compound comprising a plurality of microspheres, wherein the critical yield stress of the filling compound rises between 0.15 and 0.50 Pa for every 10° C. rise in temperature between 20° C. and 80° C.;
 a plurality of buffer tubes positioned around the core component, each of the plurality of buffer tubes configured to house at least one optical fiber; and
 a jacket formed around the core component and the plurality of buffer tubes.

10. The cable of claim 9, wherein the filling compound is further positioned within at least one of the plurality of buffer tubes.

11. The cable of claim 9, wherein the core component further comprises a wrap formed around the twisted pairs.

12. The cable of claim 9, wherein the plurality of buffer tubes comprises sixteen buffer tubes.

13. The cable of claim 9, wherein the plurality of buffer tubes are helically twisted around the core component.

14. The cable of claim 9, wherein the cable comprises an outer diameter that is less than or equal to 0.80 inches.

15. A cable, comprising:
 a core component comprising:
  a plurality of twisted pairs of individually insulated conductors;
  a wrap formed around the plurality of twisted pairs; and
  a filling compound positioned between and around the plurality of twisted pairs within the wrap, the filling compound having a density less than 0.70 g/cm$^3$ and a critical yield stress of at least 30 Pa, the filling compound comprising a plurality of microspheres;
 a plurality of buffer tubes positioned around the core component, each of the plurality of buffer tubes configured to house at least one optical fiber; and
 a jacket formed around the core component and the plurality of buffer tubes.

16. The cable of claim 15, wherein the critical yield stress of the filling compound rises between 0.15 and 0.50 Pa for every 10° C. rise in temperature between 20° C. and 80° C.

17. The cable of claim 15, wherein the filling compound is further positioned within at least one of the plurality of buffer tubes.

18. The cable of claim 15, wherein the plurality of twisted pairs comprises at least twenty-five twisted pairs and the plurality of buffer tubes comprises at least sixteen buffer tubes.

19. The cable of claim 15, wherein the cable comprises an outer diameter that is less than or equal to 0.80 inches.

20. The cable of claim 1, wherein the filling compound has a density of less than 0.45 g/cm$^3$.

* * * * *